United States Patent [19]

Kirschmann

[11] Patent Number: 5,795,446
[45] Date of Patent: Aug. 18, 1998

[54] METHOD AND EQUIPMENT FOR HEAT-OF-VAPORIZATION TRANSFER

[76] Inventor: Eduard Kirschmann, Grünlinde 4, D-30459 Hannover, Germany

[21] Appl. No.: 512,057

[22] Filed: Aug. 7, 1995

[30] Foreign Application Priority Data

Aug. 17, 1994 [DE] Germany .............. 44 30 619.9

[51] Int. Cl.$^6$ .................. B01D 1/22; B01D 3/34
[52] U.S. Cl. ............ 203/49; 159/13.1; 159/49; 159/16.3; 159/26.2; 165/110; 165/111; 165/914; 203/89; 203/96
[58] Field of Search ................. 159/16.3, 13.1, 159/26.2, 49; 203/49, 89, 96, 92, 27, DIG. 8; 165/110, 111, 133, 115, 914; 202/202, 236, 158

[56] References Cited

U.S. PATENT DOCUMENTS

| | | | |
|---|---|---|---|
| 1,562,713 | 11/1925 | Miles | 159/26.2 |
| 1,733,476 | 10/1929 | Vogelbusch | 159/26.2 |
| 1,797,232 | 3/1931 | How | 159/26.2 |
| 3,282,576 | 11/1966 | Bruckert et al. | 261/114.1 |
| 3,595,299 | 7/1971 | Weishaupt | 159/16.1 |
| 3,638,929 | 2/1972 | Brulhet | 165/134 |
| 3,724,523 | 4/1973 | Mattern | 159/13.2 |
| 3,990,862 | 11/1976 | Dahl et al. | 165/133 |
| 4,036,209 | 7/1977 | Press | 202/234 |
| 4,275,021 | 6/1981 | Kirkpatrick et al. | 202/158 |
| 4,291,758 | 9/1981 | Fujii et al. | 165/133 |
| 4,473,036 | 9/1984 | Carlson | 122/479 A |
| 4,585,055 | 4/1986 | Nakayama et al. | 165/115 |
| 4,606,405 | 8/1986 | Nakayama et al. | 165/133 |
| 4,621,681 | 11/1986 | Grover | 165/47 |
| 4,630,672 | 12/1986 | Kaufmann | 165/95 |
| 4,715,433 | 12/1987 | Schwarz et al. | 165/110 |
| 4,880,054 | 11/1989 | Yoshida et al. | 165/133 |
| 5,030,327 | 7/1991 | Lee | 203/419 |
| 5,356,451 | 10/1994 | Cain et al. | 65/414 |

Primary Examiner—Virginia Manoharan
Attorney, Agent, or Firm—Shlesinger Arkwright & Garvey LLP

[57] ABSTRACT

A method and equipment for heat-of-vaporization transfer in a heat exchanger, using steam bubbles. To achieve higher transfers at slight overheating, and with a very simple design, steam bubbles are introduced into evaporation chambers formed between heat exchanger walls, said bubbles then being deformed by said walls and rising in-between them. As they rise, the steam bubbles form a thin liquid film between themselves and the heat exchanger walls, with constrained convection inside the film. As a result excellent local conditions for heat conduction are achieved. Moreover the liquid is well mixed and by evaporation into the bubble it is cooled as far as the immediate vicinity of the heat exchanger walls.

6 Claims, 4 Drawing Sheets

METHOD AND EQUIPMENT FOR HEAT-OF-VAPORIZATION TRANSFER

FIELD OF THE INVENTION

The present invention concerns a method and equipment for transferring heat of vaporization.

BACKGROUND OF THE INVENTION

The state of the art comprises film evaporators of various geometries wherein a thin film is made to coat the heating surfaces. In addition this film is made to flow, frequently by gravity or by the friction from vapor flowing above, along the heating wall, to improve the heat transfer. Substantially higher heat transfers are achieved using nucleate boiling, however this procedure requires overheating the heating wall, entailing higher energy consumption.

Evaporator equipment is used in seawater desalination, concentrating industrial waste waters, distillation, concentrating solutions in the foodstuff industry etc.

To improve the economy and ecology of evaporators, the foremost step must be improving the heat transfer.

OBJECTS AND SUMMARY OF THE INVENTION

The object of the invention is to create a method and equipment for heat-of-vaporization transfer in such a way that higher heat transfers at lower overheating and with very simple design shall be feasible.

The problem relating to the method is solved by the present invention. Equipment with which to carry out the method are the object of the present invention as well.

Advantageous and appropriate developments of the object of the invention are stated in the following description of the invention.

The invention proposes a method and equipment wherein a comparatively large, thin film of liquid builds up with an imparted flow along a heat-exchanger wall, between steam bubbles and said wall, and wherein furthermore the motion of the steam bubbles generates convection and mixing of the liquid. As a result higher transfers are achieved than in conventional apparatus.

In the design of the invention, the distance between two heat-exchanger walls subtending a gap between them is selected to be so small that bubbles entering said gap will deform and thereby will increase their surface and hence the surface of the liquid enclosing them. Accordingly work must be done against the surface tension. On the other hand each steam bubble tends to minimize its surface and to assume a spherical shape. Because of the surface tension, additional pressure is applied to the liquid layer present between the bubble and the wall. This liquid then moves out of the way to the side. The walls bounding the gap being at a slant, the bubble between them will move upward. In the process the liquid moves around the bubble at its sides and a thin liquid film is created between the bubble and the walls, but this film is not static either, rather the liquid attempts to move out of the way to the side because of the excess pressure generated by the surface tension. Accordingly convection is imparted inside the liquid film. Excellent local conditions are then present for heat conduction. Utilization of the surface tension spreads apart the liquid between the steam bubble and the heat-exchanger walls, and thereby good convection as well a locally substantially thinner liquid film are ensured. Because of the interaction between the steam bubbles and the heat-exchanger walls, the heat conduction is substantially improved.

When the heat-exchanger walls are heated, an exceedingly efficient evaporator is achieved. The bubble surface represents an evaporation surface in the immediate vicinity of the heating walls. The thin liquid film, with constrained convection between the steam bubble and the heat-transferring walls, makes possible very high local heat transfers. If enough steam bubbles are present, the liquid cannot be unduly overheated because in practice a two-phase system will be involved. The heated liquid in the form of a buffer storage accepts this heat which it will release again by evaporation in the next steam bubble moving past but in the immediate vicinity of the particular liquid element of volume. In the process the liquid is cooled by the rising bubbles as far as the liquid laminas directly against the heat-exchanger walls, and as a result uniformity is secured in the entire evaporation space. The participating processes being random, the method of the invention is perturbation-proof.

The distance between the two heated heat-exchanger walls shall be kept less than 10 mm because the pressure exerted by the deformed bubble depends on the curvature of the bubble surface and decreases rapidly as bubble size increases. The bubble size increasing because of evaporation, the distance between the heating walls is appropriately gradually increased too in order that excessive bubble deformation be precluded.

Spontaneous formation of steam bubbles arises only for comparatively large overheating of the heated heat-exchanger walls. In order to apply the invention in the economically significant range of comparatively slight overheating, specific steps are taken to prepare bubbles. The steam bubbles are prepared in the lower evaporator zone; when rising, they stimulate the heat transfer and they enlarge by evaporation.

The interaction between the steam bubbles and the heat-exchanger wall transferring the heat can be utilized in the same manner as for condensation. This feature leads to disclosed evaporator. Again it is imperative that the steam bubbles do not completely condense in the condensing chamber, which event might cause implosions damaging the heat-exchanger walls and shortening equipment life. Such a danger is averted if, according to the present invention, the heat transfer at the evaporation side is implemented with seeded residual vapor from the condensing chamber. In this case the residual steam maintains heat transfer and therefore the flow of residual steam cannot be stopped by the heat transfer. Thus the system is self-regulating.

It is known that drip-wise condensation leads to very high heat transfers. Drip-wise condensation can be achieved by suitably coating the heat-exchanger walls and is easily combined with the present method and equipment. When the heat-exchanger walls are conical or upward-flaring pans, they are especially matched to enlarging steam bubbles, in order to avert crowding such bubbles against each other and thereby forming even larger bubbles.

Aside the direct steam-bubble seeding, steam bubbles may also be generated as defined in the present invention and with little overheating. In this latter procedure, the steam is generated by surface evaporation in suitable recesses preventing an appropriate volume of steam from rising, as a result of which the steam volume increases until a bubble detaches and rises between the heat-exchanger walls.

The method of the invention allows designing evaporation heat exchangers allowing substantially higher heat transfer at slight overheating of the heated heat-exchanger walls than offered by presently available systems. The invention is applicable wherever evaporation heat exchangers already are in operation, and beyond. Among the applications are seawater desalting plants, distillation equipment, facilities for concentrating industrial waste or rinse waters in the electroplating industry, plants for concentrating aqueous solutions in the foodstuff industry, heat exchangers between different cooling circuits in power plants, in refrigeration and in solar power work receivers. Moreover the method is applicable when using air bubbles when designing evaporation coolers illustratively used in airconditioning.

Figure 1:
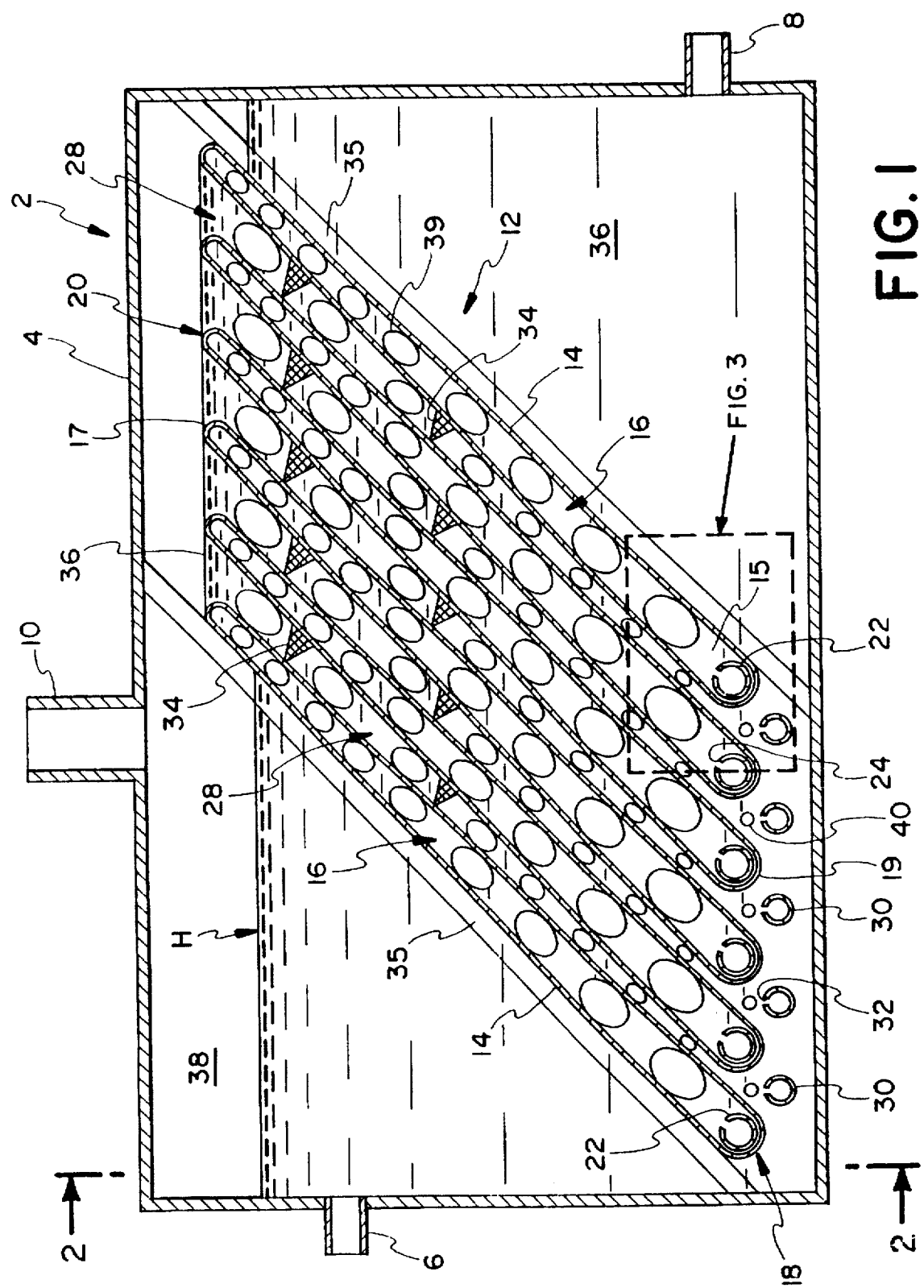
FIG. 1 schematically shows a first equipment for heat-of-vaporization transfer.

Identical components are denoted by the same references in the Figures of the drawing.

DETAILED DESCRIPTION OF THE INVENTION

Figure 2:
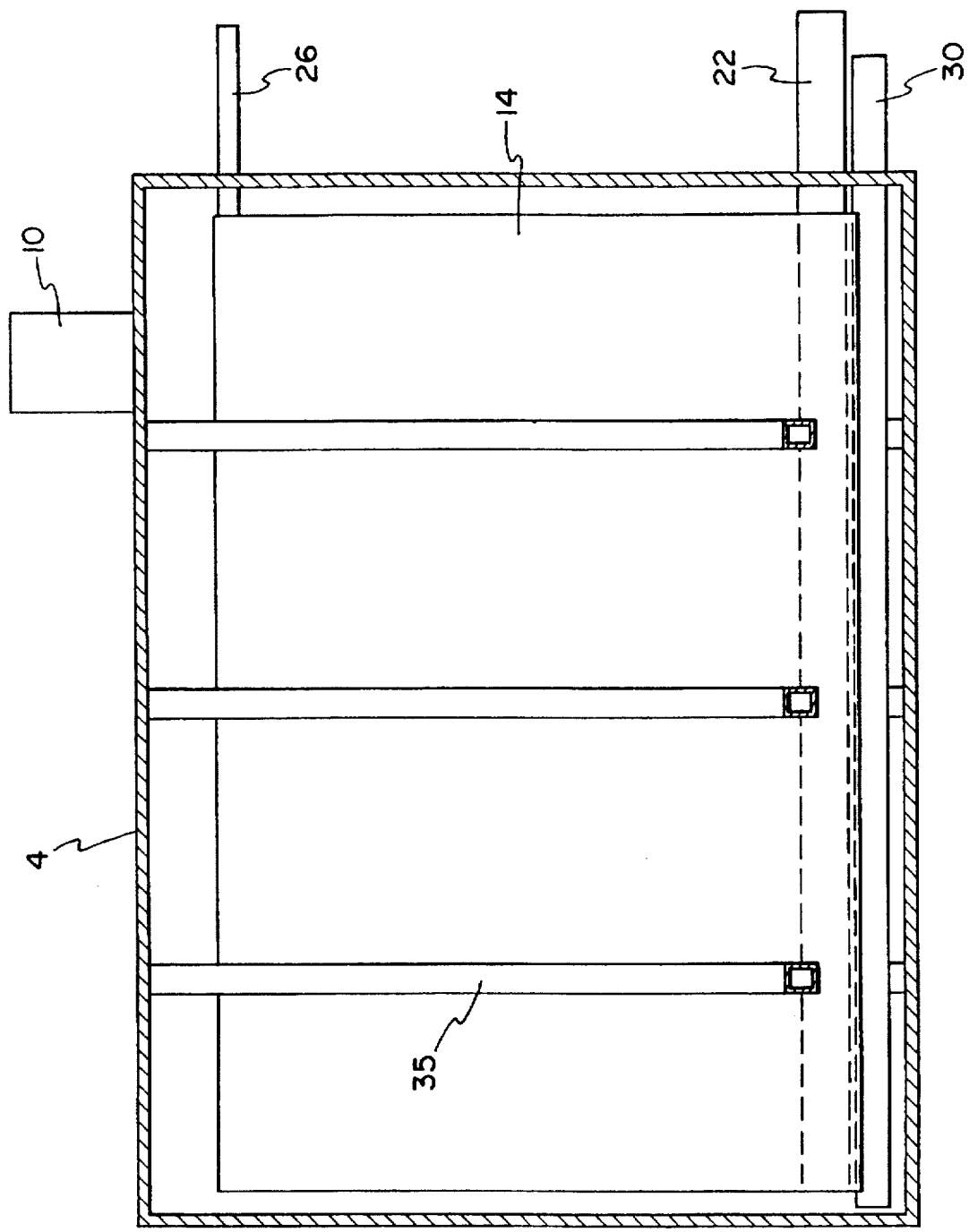
FIG. 2 is a section C—C of the equipment of FIG. 1.
Figure 3:
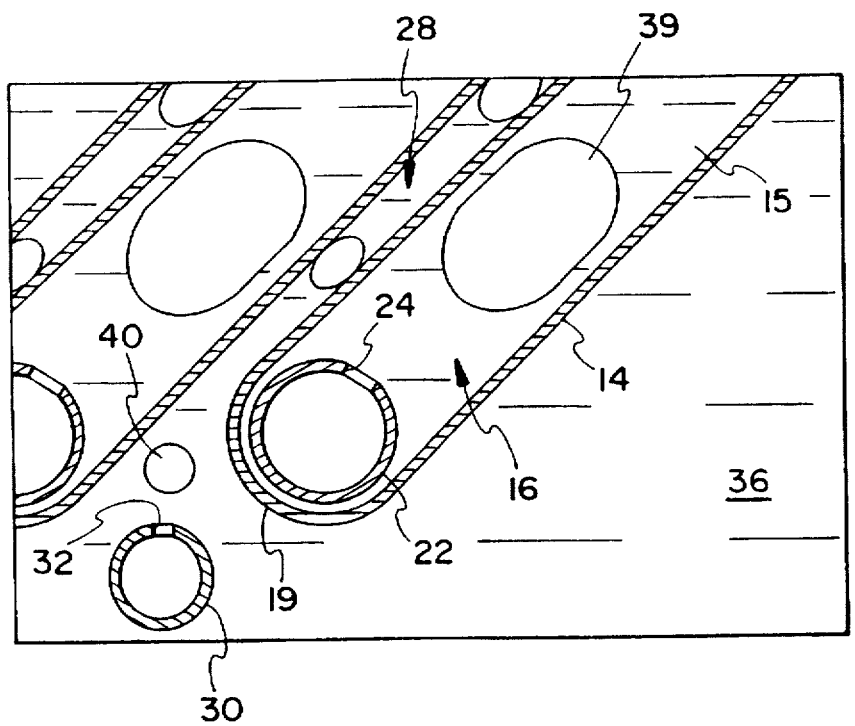
FIG. 3 is an enlargement of a zone A of the equipment of FIG. 1.

In FIGS. 1 through 3, the drawing shows a first equipment 2 for heat-of-vaporization transfer comprising a pressure-proof housing 4 fitted with an intake stub 6 for liquid to be evaporated, an outlet stub 8 for concentrated liquid and an outlet stub 10 for exhaust vapors.

The housing holds a heat exchanger 12 with a set of heat-exchanger plates 14 mounted at a slant to the horizontal and combined pairwise into closed condensing chambers 16 with upper and lower sealing walls 17, 19 and mutually at slight distances apart. The c condensing chambers 16 are filled with a condensate 15.

A blast tube 22 to blow-in heated steam enters the lower end of each condensing chamber and runs over the length of said chamber and is fitted over its own length with small boreholes 24 pointing inside the condensing chamber. An exhaust tube 26 for the residual heated steam is located at the upper end of each condensing chamber 16.

The gaps formed between the condensing chambers 16 are designed to be open evaporation chambers 28. Seed tubes 30 to seed steam are mounted along the lower ends of the evaporation chambers 28 and comprise small boreholes 32 pointing to the evaporation chambers 28.

The distance between the heat-exchanger plates 14 of the condensing chambers 16 decreases from the lower end 18 toward the upper end 20 in such manner a tapering gap is subtended from the lower to the upper ends. Accordingly each condensing chamber 28 subtends a gap flaring from below to the top.

Excess pressure prevailing in the condensing chambers 16, the heat exchanger plate walls 14 are supported on the evaporator side by supports 34 of specific heights. The outer condensing chambers 16 rest by ribs 35 against the housing 4.

The space between the condensing chambers 16, that is, the evaporation space 28, is filled with liquid 36 to be evaporated and filling the entire housing 4 to a height H. An exhaust vapor chamber 38 is located above.

Equipment 2 operates as follows: heated steam is blown through the tubes 22 and their boreholes 24 into the condensing chambers. The borehole diameter is selected in such a way that the exiting heated-steam bubbles 39 evince a diameter somewhat larger than the condensing-chamber width at this blow-in site. As the bubbles rise in the condensing chamber, they will therefore deform and hug the heat-exchanger surfaces, generating a thin liquid film with good heat-transfer behavior. The residual heated steam is laterally exhausted at the upper end of the condensing chamber through the tubes 26, in the process the obtained condensate spilling over and also being exhausted through the tubes. The condensate is separated, the residual steam being seeded through the seed tubes 30 and their boreholes 32 into the evaporation chambers. The steam bubbles 40 seeded into the evaporation chambers rise between the heat exchanger walls, enhancing heat transfer and growing by absorbing waste vapors. The residual steam bubbles increased by the waste vapors arrive at the waste-vapor chamber 38 and are exhausted through the exhaust stub 10. It is possible, furthermore, to feed steam generated in other ways to the seed tubes 30.

Figure 5:
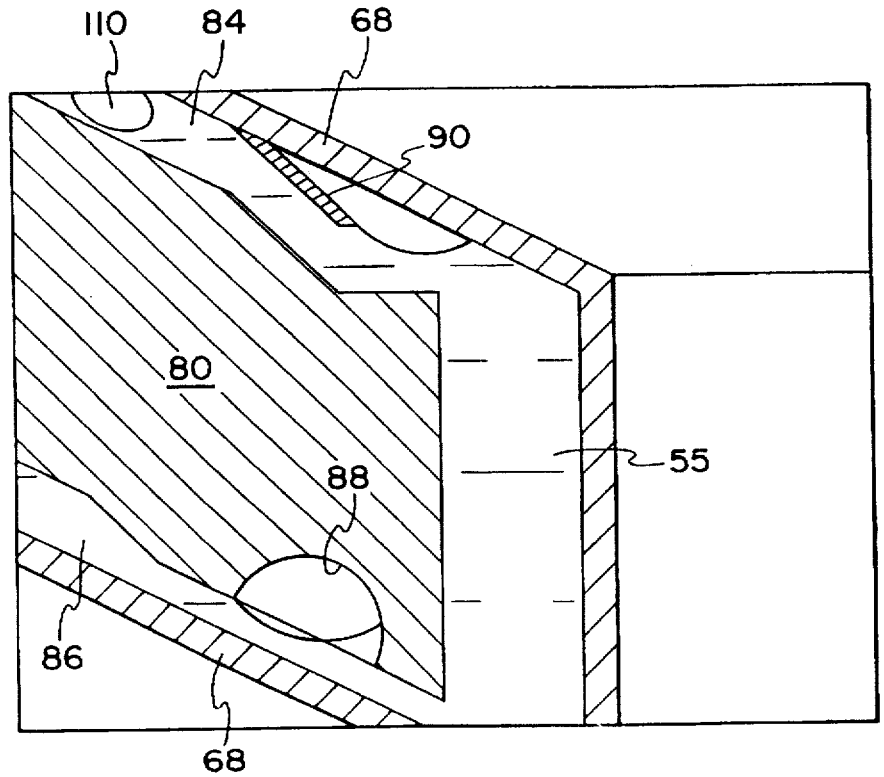
FIG. 5 is an enlargement of a zone B of the equipment of FIG. 4.
Figure 4:
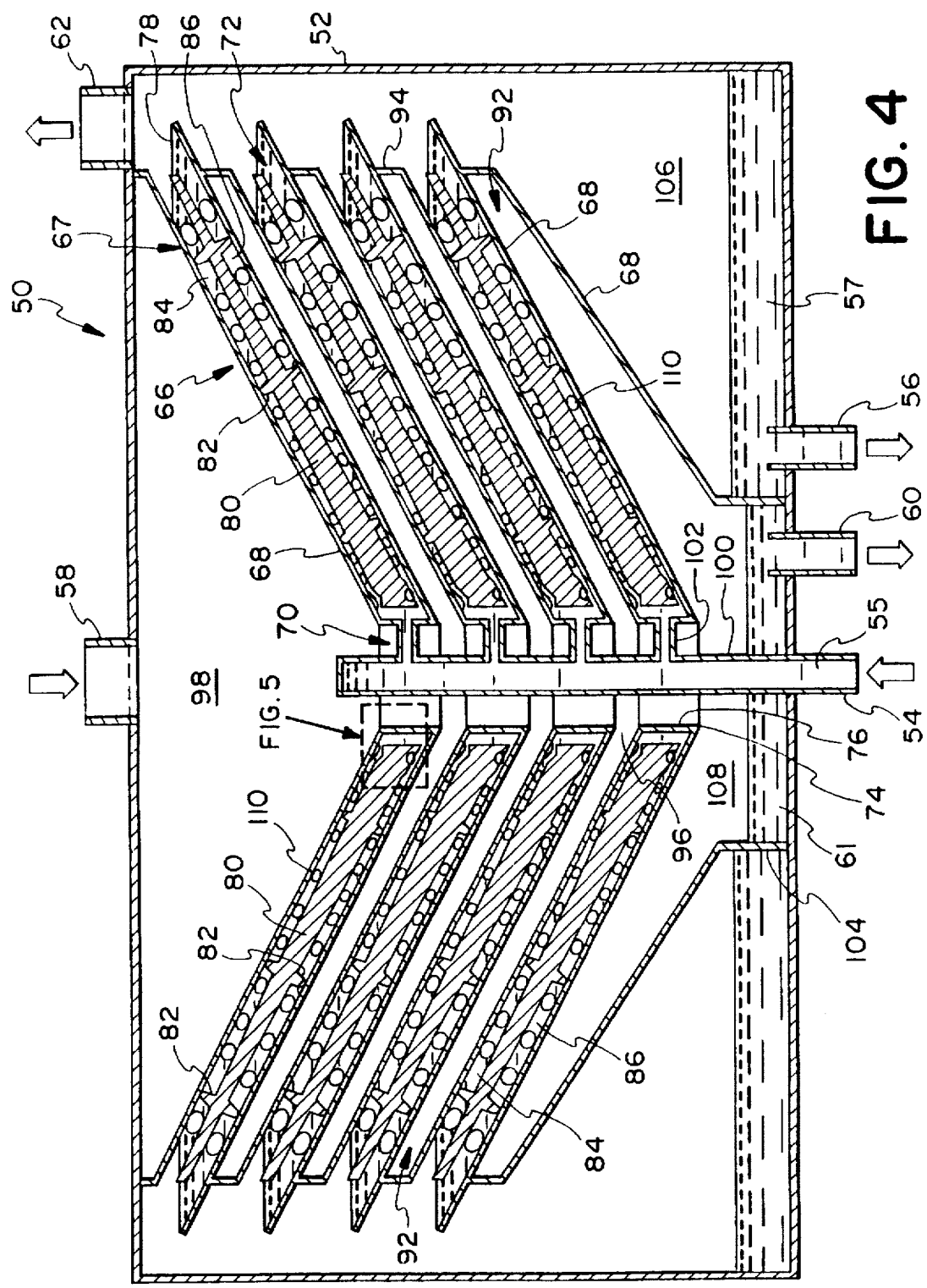
FIG. 4 is a schematic of a second equipment for heat-of-vaporization transfer.

FIGS. 4 and 5 show a second equipment 50 for heat-of-vaporization transfer and comprising a housing 52 fitted with an intake stub 54 for a liquid 55 to be evaporated, an exhaust stub 56 for a concentrated liquid 57, an intake stub 58 for heated steam, an exhaust stub 60 for a condensate 61 and an exhaust stub 62 for waste vapors.

The housing 52 contains a heat exchanger 66 with a set 67 of conical or pan-shaped superposed and mutually spaced heat exchanger walls 68 with a central aperture 70. Adjacent heat exchanger walls 68 are combined pairwise to form evaporation chambers 72 of which the lower, inside ends 74 are connected by an annular sealing wall 76 and of which the upper, outer ends 78 are open.

Conical or pan-shaped partitions 80 are mounted in the evaporation chambers 72 and comprise bilaterally integrated support elements 82 by means of which the partitions rest on the adjacent heat exchanger walls 68. The partitions are designed in such a way that the distance between the partitions 80 and the heat exchangers walls 68 flares from below toward the top, that is, that the partition thickness decreases from below toward the top in such a way that gaps 84, 86 of a width increasing from below toward the top are formed below and above the partitions 80.

At its lower end, each partition comprises underside recesses or cavities 88 to generate steam bubbles. The particular heat exchanger wall 68 above the partition is fitted with lips 90 running obliquely down from the lower partition end zone into the gap to generate steam bubbles at the top side of the partition.

The spaces between the evaporation chambers 72 are designed to be condensing chambers 92 closed at the upper ends 94 and communicating through their open lower ends 96 and the central aperture 70 with a superheated-steam chamber 98 supplied with heated steam through an intake stub 58.

The intake stub 54 for liquid to be evaporated issues into a riser pipe 100 closed at the top and passing through the central aperture 70, said riser pipe 100 communicating through lateral pipes 102 passing into the lower sealing walls 76 with the evaporation chambers 72.

The upper heat exchanger wall of the uppermost evaporation chamber 72 is connected to the housing 52 and downwardly bounds the heated steam chamber 98.

The lowermost heat exchanger wall of the lowermost condensing chamber 92 is connected by a cylindrical wall 104 enclosing the riser pipe 100 with the base of the housing 52. The wall 104 separates an annular chamber 106 for concentrated liquid 57 fitted with the exhaust stub 56 and the exhaust-vapor exhaust stub 62 from a central condensate chamber 108 enclosing the said riser pipe and fitted with the exhaust stub 60.

Equipment 50 operates as follows: The evaporation chambers 72 are supplied in constant manner through the intake stub 54 and the riser pipe 55 with liquid to be evaporated. A flow impedance decreasing from below to the top in the different, selected pipes 102 ensures that all evaporation pipes shall be filled. Heated steam is fed through intake stub 58 into the condensing chambers 92. The heated steam in this process transfers heat through the heat exchanger walls 68 to the liquid present in the evaporation chambers 72 and is condensed thereby. The resulting condensate drains centrally downward and collects in the chamber 108 from where it may be drained through the stub 60.

By means of the cavities or clearances 88 at the undersides of the lower ends of the partitions 80 and by means of the mutually opposite lips 90 of the upper heat exchanger wall, a liquid surface is provided for purposes of evaporation because a minimum quantity of steam is retained in the immediate vicinity of the heated heat exchanger walls. This design precludes rising of the said minimum steam quantity. Thereupon small steam bubbles 110 constantly are given off this minimum steam quantity and rise obliquely upward through the gaps while enlarging constantly by steadily absorbing exhaust vapors. These exhaust vapor bubbles exit at the upper ends of the evaporation chambers and are exhausted through the exhaust stub 62. Any concentrated or boiled-down liquid accumulating in the chamber 106 is carried along and is spilled over and can be removed through the exhaust stub 56.

I claim:

1. A method for heat-of-vaporization transfer in heat exchanger, employing steam bubbles, comprising the following method steps:

introducing steam bubbles into at least one evaporation chamber, consisting essentially of a liquid to be evaporated, the at least one evaporation chamber being formed between heat-transferring, heated heat exchanger walls and being mounted at a slant relative to the horizontal, allowing the introduced steam bubbles to rise in the at least one evaporation chamber, deforming the rising steam bubbles between the heat transferring, heat exchanger walls to form a constrained convection thin liquid film between the steam bubbles and the heat-transferring, heat exchanger walls by adjusting the diameter of the steam bubbles to a size at least larger than the distance between the heat exchanger walls at the side of bubble introduction whereby the steam bubbles enter the at least one evaporation chamber, and removing the steam bubbles for purposes of further use.

2. Method defined in claim 1, and wherein, the heat exchanger walls are heated with condensing heated-steam.

3. Method defined in claim 1, and including the following further method steps:

introducing heated steam in the form of bubbles into condensate-filled condensing chambers bounded by the heat exchanger walls of the at least one evaporation chambers, allowing the heated steam bubbles to rise in the condensing chambers, deforming the heated steam bubbles between the heat exchanger walls to form a thin film of condensate between the heated steam bubbles and the heat exchanger walls, and removing residual heated steam bubbles.

4. Method defined in claim 3 wherein the residual heated steam exhausted from the condensing chambers is introduced in the form of steam bubbles into the evaporation chambers.

5. Method defined in claim 1, wherein the steam bubbles are blown-in or generated at the lower ends of the at least one evaporation chambers.

6. Method defined in claim 5, wherein a liquid surface is made available at the lower end of the at least one evaporation chamber for evaporation in order to generate the steam bubbles by retaining a minimum quantity of steam in the immediate vicinity of the heat exchanger walls, steam bubbles being released from the minimum steam quantity.

* * * * *